US012589702B2

(12) United States Patent
Kaltenmark et al.

(10) Patent No.: US 12,589,702 B2
(45) Date of Patent: Mar. 31, 2026

(54) VEHICLE INCLUDING A-PILLAR GARNISH EXTENDING INTO AIRFLOW GAP AND UNDERNEATH HOOD

(71) Applicant: Honda Motor Co., Ltd., Tokyo (JP)

(72) Inventors: Douglas Kaltenmark, Powell, OH (US); Timothy J. Rupp, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 18/429,936

(22) Filed: Feb. 1, 2024

(65) Prior Publication Data

US 2025/0249841 A1     Aug. 7, 2025

(51) Int. Cl.
    *B60R 13/02*      (2006.01)
    *B60R 13/04*      (2006.01)
    *B62D 25/04*      (2006.01)

(52) U.S. Cl.
    CPC ............ *B60R 13/025* (2013.01); *B60R 13/04* (2013.01); *B62D 25/04* (2013.01)

(58) Field of Classification Search
    CPC ...... B62D 25/04; B62D 25/10; B62D 25/105; B62D 25/081; B60R 13/04; B60R 13/025
    USPC .......................................... 296/193.06, 1.08
    See application file for complete search history.

(56) References Cited

U.S. PATENT DOCUMENTS

| | | | | |
|---|---|---|---|---|
| 6,209,950 | B1 * | 4/2001 | Hanyu ................. | C09D 11/324 |
| | | | | 296/203.02 |
| 8,579,365 | B2 | 11/2013 | Makise et al. | |
| 9,573,559 | B2 | 2/2017 | Nishida et al. | |
| 9,783,242 | B2 | 10/2017 | Watanabe et al. | |
| 9,862,424 | B2 | 1/2018 | Yamamoto | |
| 2009/0218850 | A1 * | 9/2009 | Sase ......................... | B60R 13/04 |
| | | | | 296/187.02 |
| 2010/0060037 | A1 * | 3/2010 | Terai .......................... | B60J 1/10 |
| | | | | 296/193.06 |
| 2016/0288736 | A1 * | 10/2016 | Hein ......................... | B60R 13/04 |
| 2016/0325697 | A1 * | 11/2016 | Rogge ..................... | B60R 13/04 |
| 2019/0152419 | A1 * | 5/2019 | Tanaka ................... | B60R 13/025 |
| 2019/0217899 | A1 * | 7/2019 | Ikeda ...................... | B62D 25/04 |
| 2023/0382461 | A1 * | 11/2023 | Han ......................... | B62D 25/04 |
| 2025/0178545 | A1 * | 6/2025 | Rupp ..................... | B60R 13/025 |
| 2025/0249841 | A1 * | 8/2025 | Kaltenmark .......... | B60R 13/025 |
| 2025/0263028 | A1 * | 8/2025 | Rupp ..................... | B62D 25/04 |

FOREIGN PATENT DOCUMENTS

| | | | |
|---|---|---|---|
| CN | 203844844 | U | 9/2014 |
| CN | 206125179 | U | 4/2017 |
| CN | 112449622 | A | 3/2021 |
| CN | 214189801 | U | 9/2021 |

(Continued)

*Primary Examiner* — Gregory Blakenship
(74) *Attorney, Agent, or Firm* — KENEALY VAIDYA LLP

(57) ABSTRACT

A vehicle can include a windshield, an A-pillar that is adjacent to the windshield, a hood that is adjacent to the A-pillar and spaced away from the A-pillar by an airflow gap, and an A-pillar garnish. The A-pillar garnish can extend along the windshield and cover at least a portion of the A-pillar. The A-pillar garnish can extend underneath the hood and bend away from the A-pillar and toward the hood. The A-pillar garnish can extend into the airflow gap at a location that is underneath the hood.

20 Claims, 4 Drawing Sheets

(56)　　　　　References Cited

FOREIGN PATENT DOCUMENTS

| | | | |
|---|---|---|---|
| CN | 215513875 U | 1/2022 | |
| CN | 115489446 A | 12/2022 | |
| CN | 218505784 U | 2/2023 | |
| JP | 2015174622 A | 10/2015 | |
| JP | 2021172259 A | 11/2021 | |
| JP | 2023108219 A | 8/2023 | |
| KR | 1998039795 U | 9/1998 | |
| KR | 1998042584 U | 9/1998 | |
| KR | 19990016647 U | 5/1999 | |
| WO | WO-2025203284 A1 * | 10/2025 | ............. B62D 25/04 |

* cited by examiner

VEHICLE INCLUDING A-PILLAR GARNISH EXTENDING INTO AIRFLOW GAP AND UNDERNEATH HOOD

BACKGROUND

The disclosed subject matter relates to an A-pillar garnish for a vehicle. More particularly, the disclosed subject matter relates to methods and apparatuses that block an airflow path that is directed underneath the hood of a vehicle.

A vehicle can include a main frame, a plurality of pillars, a roof and a windshield. The pillars can be connected to the main frame and spaced along the main frame in a longitudinal direction of the vehicle. The pillars can be arranged in pairs and support the roof above the frame. The pillars of each pair can be spaced apart in a transverse direction of the vehicle. A first pair of the pillars can be referred to as A-pillars. Each of the A-pillars can be near the front of the vehicle and can extend along either side of and support the windshield. A door of the vehicle can be supported on the A-pillar by at least one hinge.

The vehicle can include decorative panels that are mounted onto the door or other part(s) of the vehicle such as, but not limited to, the pillars, a bumper, a fender, or a trunk lid. These decorative panels can contribute to the aesthetic appearance of the vehicle. Each decorative panel can include an exterior surface that forms a portion of the exterior surface of the vehicle. The exterior surface of the decorative panel can have a color that is the same as the overall color of the vehicle or a color that is complimentary to the overall color of the vehicle. The exterior surface of the decorative panel can have a texture that is the same as or different from the texture of another portion of the exterior surface of the vehicle.

SUMMARY

Some embodiments are directed to a vehicle that can include a windshield, an A-pillar that is adjacent to the windshield, a hood that is adjacent to the A-pillar and spaced away from the A-pillar by an airflow gap, and an A-pillar garnish. The A-pillar garnish can extend along the windshield and cover at least a portion of the A-pillar. The A-pillar garnish can extend underneath the hood and bend away from the A-pillar and toward the hood. The A-pillar garnish can extend into the airflow gap at a location that is underneath the hood.

Some embodiments are directed to a vehicle that can include a windshield, an A-pillar, a hood, a gasket, an inner garnish panel, and an outer garnish panel. The A-pillar can be adjacent to the windshield and the hood can be adjacent to the A-pillar and spaced away from the A-pillar by an airflow gap. The gasket can be adjacent to the A-pillar, while the inner garnish panel can be adjacent to gasket, and the outer garnish panel can be adjacent to the inner garnish panel. At least one of the gasket and the inner garnish panel can extend underneath the hood and bend away from the A-pillar and toward the hood. The least one of the gasket and the inner garnish panel can extend into the airflow gap at a location that is underneath the hood.

Some embodiments are directed to a vehicle that can include a windshield, an A-pillar, a door, a hood, and an A-pillar garnish. The A-pillar can be adjacent to the windshield. The door can be hinged to the A-pillar and include a front edge. The hood can be adjacent to the A-pillar and spaced away from the A-pillar by an airflow gap. The hood can include a rear edge that opposes the front edge. A panel gap can separate the front edge and the rear edge from each other. The A-pillar garnish can extend along the windshield and cover at least a portion of the A-pillar. The A-pillar garnish can extend underneath the hood and bend away from the A-pillar and toward the hood. The A-pillar garnish can extend into the airflow gap at a location that is underneath the hood.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figures 1, 2:
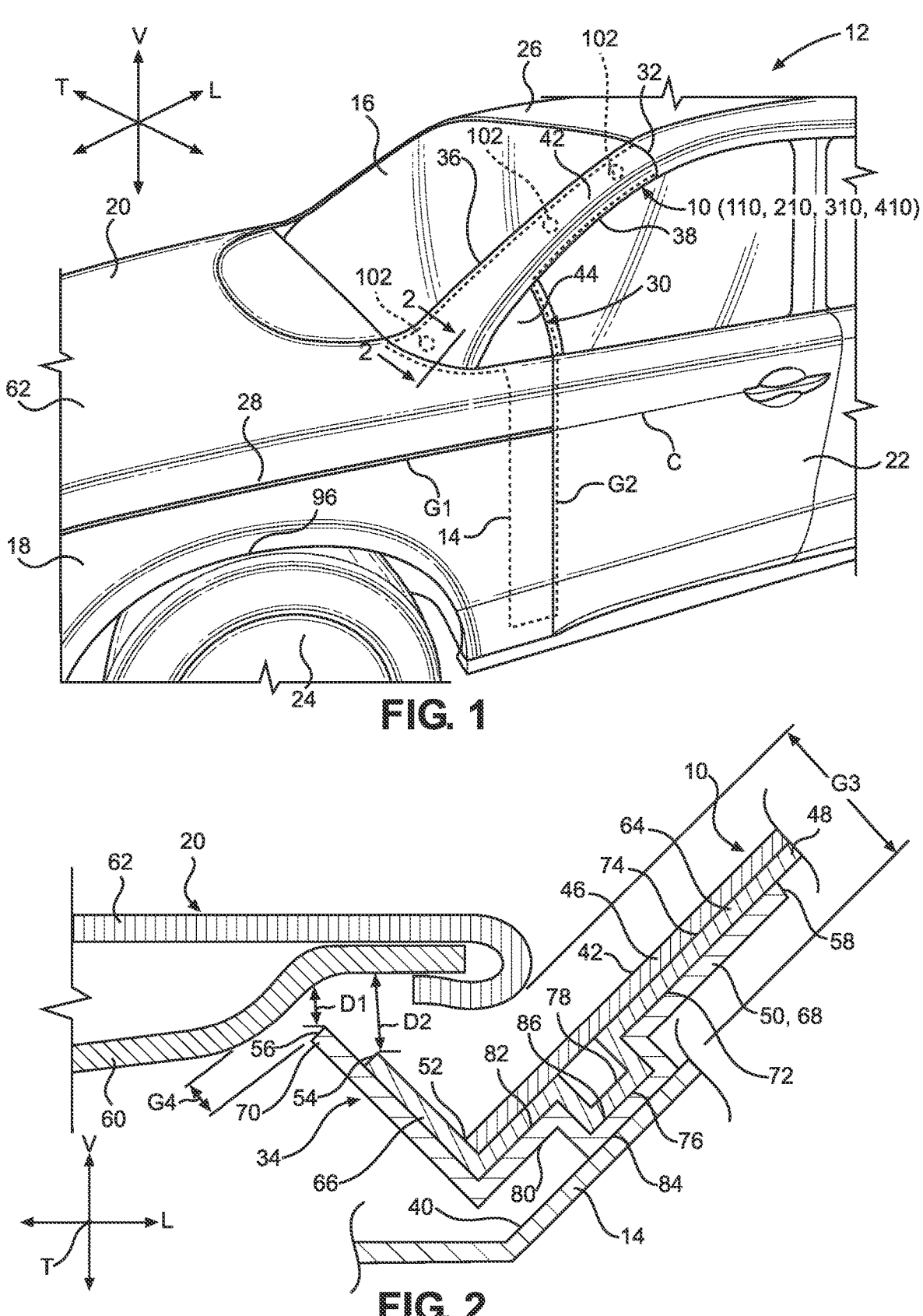
FIG. 1 is a perspective view of a front portion of a vehicle that includes a pillar garnish made in accordance with principles of the disclosed subject matter.
FIG. 2 is cross-sectional view taken along line 2-2 of FIG. 1.

FIG. 1 illustrates an embodiment of an A-pillar garnish 10 for a vehicle 12 made in accordance with principles of the disclosed subject matter. The vehicle 12 can include an A-pillar 14, a windshield 16, a front fender panel 18, a hood 20, a door 22, a front wheel 24 and a roof 26. Each of the front fender 18 and the hood 20 can be referred to as a body panel.

The A-pillar 14 can be concealed by the A-pillar garnish 10 and the front fender panel 18. The A-pillar 14 is shown schematically and in phantom in FIG. 1. The A-pillar 14 can extend from the roof 26 to a main frame under the floor of the vehicle 12. The main frame is obstructed from view and omitted from FIG. 1 for clarity and simplicity of the drawing. The A-pillar 14 can support the roof 26 above the main frame.

The windshield 16, the front fender 18 and the door 22 can be adjacent to the A-pillar 14, and the windshield 16 and the door 22 can be mounted onto the A-pillar 14. The door 22 can be connected to one or more hinges that are mounted onto the A-pillar 14 so that the door 22 can pivot relative to the A-pillar 14. The front fender panel 18 can include a wheel arch 96 that extends along the front wheel 24.

Referring to FIG. 2, the A-pillar 14 can have an exterior surface 40 that, in the exemplary embodiment, does not form a portion of the exterior surface of the vehicle 12. Instead, the A-pillar garnish 10 can include an exterior surface 42 that forms a portion of the exterior surface of the vehicle 12 and provides an aesthetic appearance for the vehicle 12 that is different from that without the A-pillar garnish 10. For example, exterior surface 42 of the A-pillar garnish 10 can be of a color and/or texture that is different from another portion of the exterior surface of the vehicle 12.

Returning to FIG. 1, the vehicle 12 can include a longitudinal direction L, a transverse direction T and a vertical direction V. The hood 20 can include an extension 28 that extends toward the front fender panel 18 along the vertical direction V. The extension 28 can also extend along the front fender panel 18 in the longitudinal direction L. The extension 28 can terminate in the longitudinal direction L at the door 22. Together, the extension 28 and the front fender panel 18 can form the front fender of the vehicle 12. The extension 28, the door 22 and the front fender panel 18 can be spaced apart from each other by a second panel gap G2 that extends in the vertical direction V of the vehicle 12.

The hood 20 can be referred to as a clam shell hood because the hood 20 forms at least a portion of the front fender. The clam shell hood 20 can provide at least one benefit to the vehicle 12 as compared to a hood without the extension 28. As shown in FIG. 1, the lower edge of the extension 28 can be aligned with a character line C that extends along the door 22. As a result, a first panel gap G1 between the hood 20 and the front fender panel 18 can be aligned with the character line C. The alignment of the first gap G1 with the character line C can disguise the first panel gap G1 from an observer of the vehicle 12.

In other exemplary embodiments, the extension 28 of the clam shell hood 20 can include at least a portion of the wheel arch 96 and extend from the front bumper facia (not shown) to the second panel gap G2 at the door 22. Thus, the surface of the front fender can be continuous from the front bumper facia to the second panel gap G2. The continuous fender surface can have a positive impact on the aesthetic appearance of the vehicle 12.

In yet other exemplary embodiments, the extension 28 can incorporate the entire structure of the front fender panel 18 and the front fender panel 18 can be omitted from the vehicle 12. As a result, a mechanic can readily access the engine compartment and the suspension components of the vehicle 12 when the clam shell hood 20 is opened.

However, the clam shell hood 20 can complicate the spatial relationship between the A-pillar 14 and the hood 22 due to hood swing variation and the swing path of the hood 20 being relatively close to the A-pillar 14. As a result, a relatively large airflow space G3 (FIG. 2) can be present between hood 20 and the A-pillar 14. Air that flows into the airflow space G3 can generate wind noise when the vehicle 12 is in motion. This wind noise can be perceived as undesirable by one or more occupants of the vehicle 12.

Although the airflow space G3 is indicated with a dimension between the right end (as viewed in FIG. 2) of the hood 20, the airflow space G3 can extend leftward (as viewed in FIG. 2) from the right end of the hood 20 and beyond the A-pillar garnish 10.

A first possible solution to prevent undesirable wind noise due to the presence of the airflow space G3 can include a hinge cover that sits between the clam shell hood 20 and the A-pillar 14. One benefit of the first possible solution can include better protection of the A-pillar 14 during hood swing so that the hood 20 does not inadvertently strike the A-pillar 14 or the A-pillar garnish 10. Another benefit of the first possible solution can include a relative reduction in size of the airflow space G3 between the hood 20 and the A-pillar 14 so that wind noise can be reduced to a level that the one or more occupants of the vehicle 12 might perceive as acceptable.

The first possible solution can include detriments that might be considered to outweigh the benefits. The first possible solution can increase cost of the vehicle 12 due to the addition of the hinge cover. Further, the hinge cover can have a low gloss appearance and can be viewed by an observer. The relatively large size and low gloss appearance can detract from the aesthetic appearance of the vehicle 12.

A second possible solution can forgo the hinge cover and reduce the size of the airflow space G3 by modifying the A-pillar 14 and/or the A-pillar garnish 10 to be closer to the clam shell hood 20. Since the A-pillar 14 and the A-pillar garnish 10 can have a high gloss finish, the second possible solution can avoid the aesthetic detriment of the first possible solution. However, the second possible solution might not reduce the airflow space G3 as effectively as the first possible solution due to the clearance set for the swing variation and the swing path of the hood 20.

Thus, there is a need for a method and apparatus that can accommodate the swing path and swing variation of the clam shell hood 20, while also providing an observer of the vehicle 12 with a positive perception of the wind noise and the aesthetic appearance of the vehicle 12.

Referring to FIG. 2, the A-pillar garnish 10 can terminate at a lower end 34 that is tucked underneath the hood 20. The exterior surface 42 of the A-pillar garnish 10 can be configured to enhance an observer's perception of the aesthetic appearance for this portion of the vehicle 12. The A-pillar garnish 10 can bend away from the A-pillar 14 and toward the hood 20 along the vertical direction V of the vehicle 12 to block most or all of the airflow space G3. This bend can decrease the flow of air flowing into the airflow space G3 and the noise generated by the air flowing into the airflow space G3. Thus, the A-pillar garnish 10 can contribute to a positive aesthetic perception of the vehicle 12 and reduce wind noise to or below a level that an occupant of the vehicle 12 can perceive as an acceptable level.

Returning to FIG. 1, the vehicle 12 can include a pillar corner garnish 30. The A-pillar garnish 10 can cover or conceal most of the portion of the A-pillar 14 that extends along the windshield 16. The pillar corner garnish 30 can cover a portion of a side portion of the A-pillar 14. The A-pillar garnish 10 and the pillar corner garnish 30 can be made from any appropriate material such as, but not limited to plastic, chrome plated plastic, carbon fiber, fiberglass, fiber-reinforced plastic, sheet molding compound, aluminum, aluminum alloy, steel, stainless steel, or chrome-plated steel. The A-pillar garnish 10 and the pillar corner garnish 30 can be painted the same color as the exterior of the vehicle 12, or a color that is complementary to the exterior color of the vehicle 12, or unpainted, or painted with a clear coat on the natural exterior surface of the garnishes 10, 30, or chrome plated, or anodized.

Each of the garnishes 10, 30 can be referred to as a decorative panel, a trim panel, an exterior panel, a pillar panel, a body panel, a body cladding or a pillar cladding. The pillar corner garnish 30 could instead be used with a typical side panel outer (SPO) instead or in addition to at the A-pillar 14. The pillar corner garnish 30 could also be used in applications where styling line or appearance continuation is desired, even at locations away from the A-pillar 14.

The pillar corner garnish 30 can include an exterior surface 44. The exterior surface 44 can form a portion of the exterior surface of the vehicle 12. The exterior surface 44 can be flush or substantially flush with the exterior surface 42 of the A-pillar garnish 10 such that an observer of the exterior surfaces 42, 44 would believe that these surfaces appear flush with each other. Either or both of the exterior surfaces 42, 44 can have a texture that is the same as or different from the texture of the exterior surface of any of the front fender panel 18, the hood 20 and the door 22 or each other.

The pillar corner garnish 30 can include a plurality of connectors mounted on a rear surface of the pillar corner garnish 30. Each of the connectors can be any appropriate connector such as, but not limited to, a threaded fastener, a rivet, a clamp, a clip, mating snap-fitting structures, an adhesive bead, an adhesive tape, or mating hook and loop fasteners.

The A-pillar garnish 10 can include an upper side 32, a first side 36 and a second side 38. The upper side 32 can be adjacent to the roof 26 and the upper side of the windshield 16. The first side 36 can extend along the windshield 16 and the second side 38 can extend along the door 22.

Referring to FIG. 2, the A-pillar garnish 10 can include a lower end 34. The lower end 34 can be adjacent to and underneath the hood 20 and adjacent to the lower side of the windshield 16. The A-pillar garnish 10 can be elongated generally along the longitudinal direction L of the vehicle 12 such that a length measured from the lower end 34 to the upper side 32 is greater than a dimension measured from the first side 36 to the second side 38.

The A-pillar garnish 10 can include an outer garnish panel 46, an inner garnish panel 48 and a gasket 50. The outer garnish panel 46 can include the exterior surface 42 of the A-pillar garnish 10. The gasket 50 can abut the exterior surface 40 of the A-pillar 14 and the inner garnish panel 48 can be sandwiched between the outer garnish panel 46 and the gasket 50. That is, the gasket 50 can be adjacent to the A-pillar 14, the inner garnish panel 48 can be adjacent to the gasket 50 and the outer garnish panel 46 can be adjacent to the inner garnish panel 48.

The outer garnish panel 46 can include the sides 32, 36, 38 of the A-pillar and a first lower end 52. The outer garnish panel 46 can extend from the upper side 32 to the lower end 52 and terminate at the upper side 32 and the first lower end 52. The inner garnish panel 48 can include a second lower end 54 and extend from the upper side 32 to a second lower end 54. The inner garnish panel 48 can terminate at the upper side 32 and the second lower end 54. The gasket can 50 include and terminate at a first end 56 and a second end 58.

The ends 52, 54, 56 can be located underneath the hood 20 and in the airflow space G3 between the hood 20 and the A-pillar 14 in the vertical direction V of the vehicle 12. The hood 20 can include a hood inner panel 60 and a hood outer panel 62. The ends 54, 56 can be adjacent to the hood inner panel 60. The first end 56 of the gasket 50 can be spaced away from the hood inner panel 60 by a first distance D1 and the second lower end 54 of the inner garnish panel 48 can be spaced away from the hood inner panel 60 by a second distance D2 that is greater than the first distance. That is, the first end 56 of the gasket 50 can be located between the hood inner panel 60 and the second lower end 54 of the inner garnish panel 48. The first distance D1 can be zero, such that the relatively soft gasket 50 (as compared to the inner garnish panel 48) comes into contact with the hood 20 to seal the area under the hood 20 from air entering from about proximal end of the hood 20 immediately adjacent the A-pillar 14.

Figure 3:
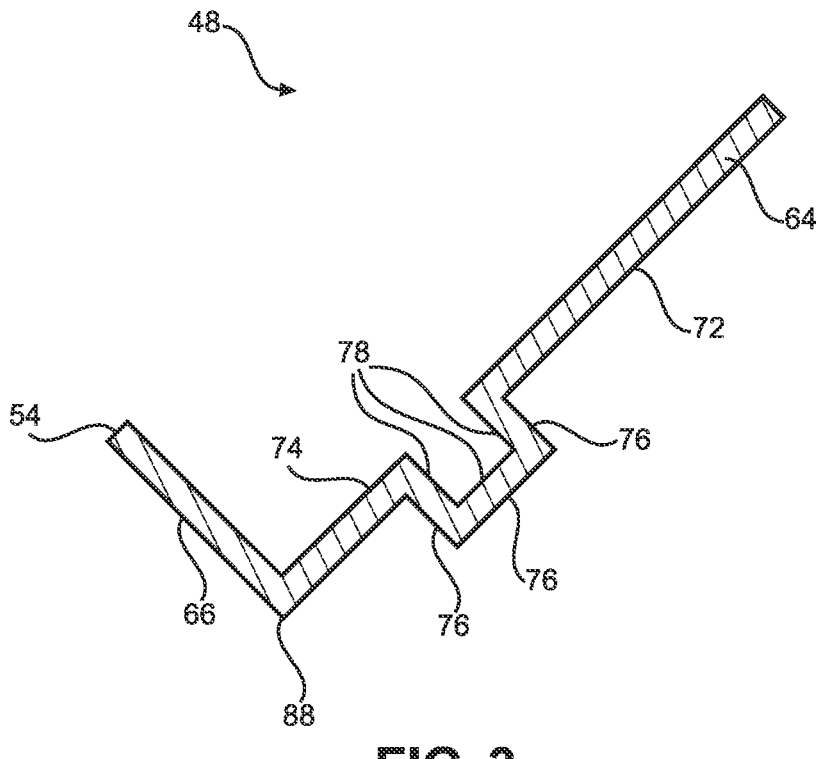
FIG. 3 is a cross-sectional view of the inner garnish panel of FIG. 2.

Referring to FIGS. 2 and 3, the inner garnish panel 48 can include a pillar panel 64 and an extension panel 66. The pillar panel 64 can be located between the outer garnish panel 46 and the gasket 50. The first lower end 52 the outer garnish panel 46 can terminate at the extension panel 66 and be adjacent to or abut the extension panel 66. That is, the outer garnish panel 46 can cover the pillar panel 64 and can expose the extension panel 66. The outer garnish panel 46 can obstruct the pillar panel 64 from view from outside of the vehicle 12.

The pillar panel 64 can extend along the A-pillar 14 and the extension panel 66 can protrude from the pillar panel 64. The extension panel 66 can extend away from both of the A-pillar 14 and the outer garnish panel 46 and toward the hood inner panel 60. The pillar panel 64 can extend along the A-pillar 14 from the upper side 32 to the extension panel 66 in a first direction that is oblique to both of the longitudinal direction L and the vertical direction V. The extension panel 66 can extend away from the pillar panel 64 in a second direction that is different from the first direction. That is, the inner garnish panel 48 can bend away from both of the A-pillar 14 and the outer garnish panel 46 and toward the hood 20.

Figure 4:
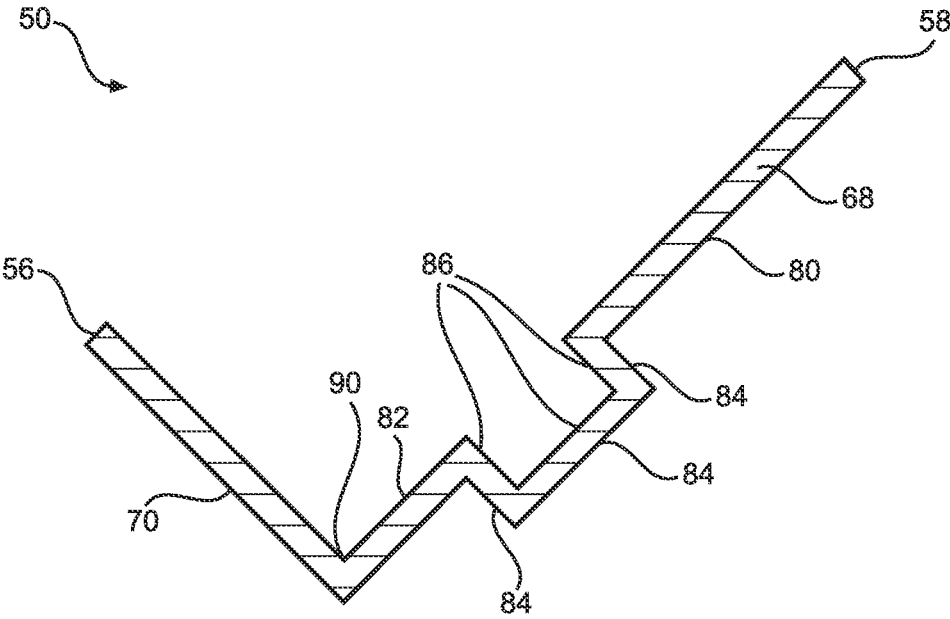
FIG. 4 is a cross-sectional view of the gasket of FIG. 2.

Referring to FIGS. 2 and 4, the gasket 50 can include a body 68 and an extension 70. The body 68 can be located between the pillar panel 64 and the A-pillar 14. The pillar panel 64 and the outer garnish panel 46 can cover the body 68 and obstruct the body 68 from view from outside of the vehicle 12. The extension 70 can form the lower end 34 of the A-pillar garnish 10.

The body 68 can extend along the A-pillar 14 and the extension 70 can protrude from the body 68. The extension 70 can extend away from both of the A-pillar 14 and the outer garnish panel 46 and toward the hood inner panel 60. The body 68 can extend along the A-pillar 14 from the second end 58 to the extension 70 in a first direction that is oblique to both of the longitudinal direction L and the vertical direction V. The extension 70 can extend away from the body 68 in a second direction that is different from the first direction. That is, the gasket 50 can bend away from both of the A-pillar 14 and the outer garnish panel 46 and toward the hood 20.

The extension 70 can abut and extend along the extension panel 66. The extension 70 can extend beyond the extension panel 66 in the second direction. The extension 70 can form a reduced airflow space G4 between the first end 56 of the gasket 50 and the hood inner panel 60. The dimension indicated in FIG. 2 for the reduced airflow space G4 can be smaller than the dimension indicated in FIG. 2 for the airflow space G3. Thus, the reduced airflow space G4 can effectively reduce the wind noise as compared to the wind noise generated by air flowing through the unobstructed airflow space G3.

The gasket 50 can be made from a flexible material such as, but not limited to, rubber, plastic, or an elastomer. The outer garnish panel 46 and the inner garnish panel 48 can be made from any appropriate material such as, but not limited to, plastic, metal, metal alloy, carbon fiber, fiber reinforced plastic, rubber, and sheet molding compound or a composite of any of these materials. The inner garnish panel 48 can have a first rigidity and the gasket 50 can have a second rigidity that is less than the first rigidity. The extension 70 of the gasket 50 can be resiliently deformed if the hood inner panel 60 inadvertently contacts the first end 56 of the gasket 50.

Referring to FIGS. 2 and 3, the inner garnish panel 48 can include a first inner side 72, a first outer side 74, a first convex surface 76 and a first concave surface 78. The first inner side 72 can face and oppose the gasket 50. The first outer side 74 can face, oppose and abut the outer garnish panel 46. The first convex surface 76 can be on the first inner side 72 and the first concave surface 78 can be on the first outer side 74. The first convex surface 76 can protrude toward the A-pillar 14. The first concave surface 78 can face away from the A-pillar 14 and face toward the hood 20.

Referring to FIGS. 2 and 3, the gasket 50 can include a second inner side 80, a second outer side 82, a second convex surface 84 and a second concave surface 86. The second inner side 80 can face and oppose the A-pillar 14. The second outer side 82 can face, oppose and abut the first inner side 72 of the inner garnish panel 48. The second convex surface 84 can be on the second inner side 80 and the second concave surface 86 can be on the outer side 82. The second convex surface 84 can protrude toward the A-pillar 14. The second concave surface 86 can face away from the A-pillar 14 and face toward the hood 20.

Each of the convex surfaces 76, 84 and the concave surfaces 78, 86 can include a plurality of linear segments that are arranged in a rectangular shape in cross-section.

The first convex surface 76 can abut the second concave surface 86. The first convex surface 76 and the second concave surface 86 can be a datum that facilitates proper alignment of the gasket 50 on the inner garnish panel 48. The first convex surface 76 and the second concave surface 86 can resist movement of the gasket 50 relative to the inner garnish panel 48 and vice versa.

Referring to FIG. 3, the extension panel 66 and the pillar panel 64 of the inner garnish panel 48 can form an outer corner 88. Referring to FIG. 4, the body 68 and the extension 70 of the gasket 50 can form an inner corner 90. The outer corner 88 can abut the inner corner 90.

The gasket 50 can be connected to the inner garnish panel 48 in any appropriate manner such as, but not limited to, threaded fasteners, clips, clamps, staking, insert molding, vulcanization, and/or adhesive. The outer garnish panel 46 and the inner garnish panel 48 can be connected to each other in any appropriate manner such as, but not limited to, threaded fasteners, clips, clamps, staking, ultrasonic welding, and/or adhesive.

Returning to FIG. 1, the A-pillar garnish 10 can be connected to the A-pillar 14 by one or more connectors 102. FIG. 1 schematically illustrates the connectors 102 in phantom. Each of the connectors 102 can be any appropriate connector such as, but not limited to, a threaded fastener, a rivet, a clamp, a clip, mating snap-fitting structures, an adhesive bead, an adhesive tape, or mating hook and loop fasteners. In exemplary embodiments, the fasteners 102 can be secured to an inner side of the of the outer garnish panel 46 that faces the inner garnish panel 48 and the fasteners 102 can pass through the inner panel 48 and into the A-pillar 14. In alternate embodiments, the outer garnish panel 46 can be connected to the inner garnish panel separately from the fasteners 102 and the fasteners 102 can be secured to and protrude from the first inner side 72 of the inner garnish panel 48.

Figures 5, 6:
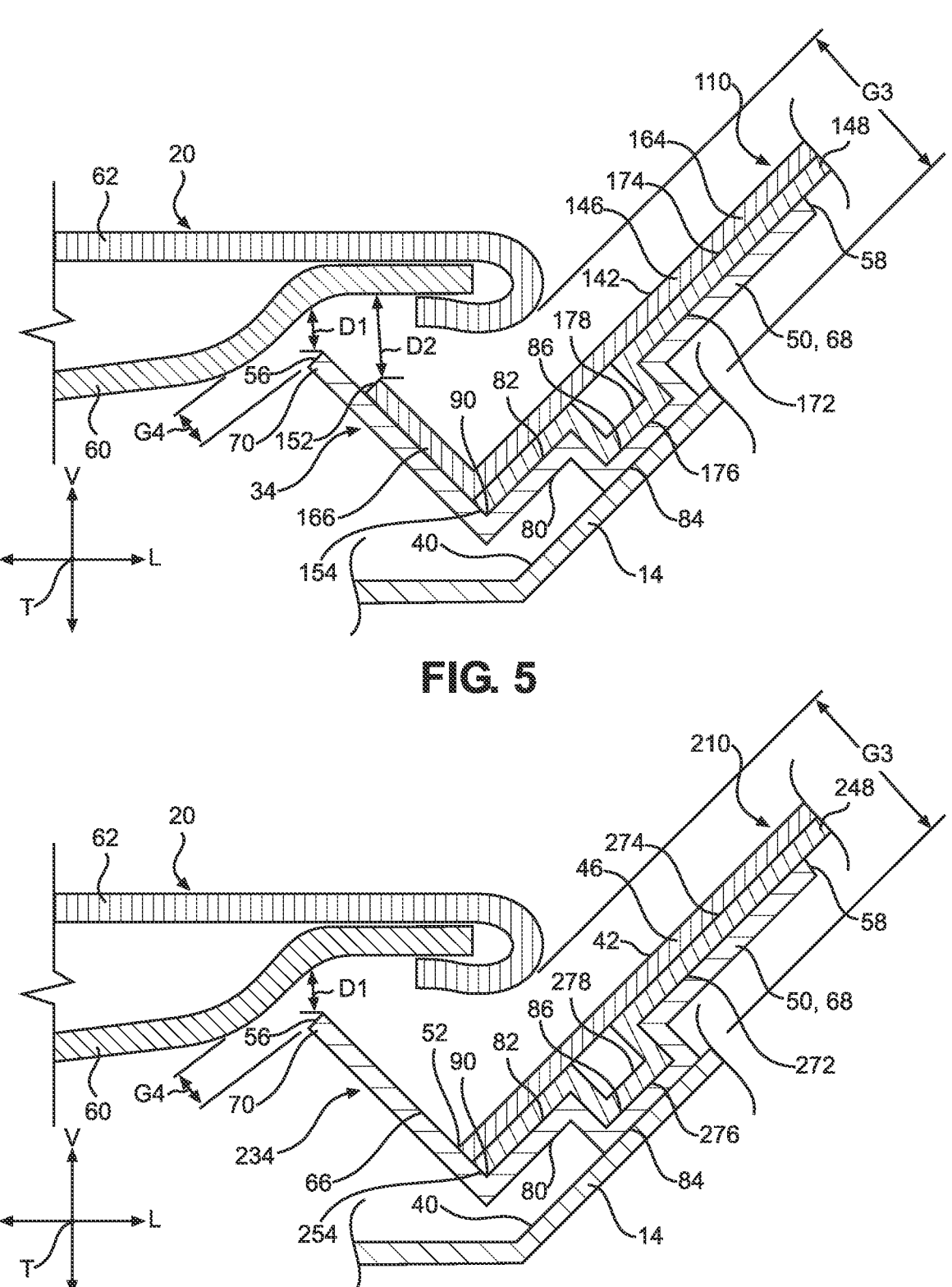
FIG. 5 is a cross-sectional view of a first alternate embodiment of the pillar garnish and taken along line 2-2 of FIG. 1.
FIG. 6 is a cross-sectional view of a second alternate embodiment of the pillar garnish and taken along line 2-2 of FIG. 1.

FIG. 5 is a cross-sectional view of a first alternate embodiment of an A-pillar garnish 110. The A-pillar garnish 110 can include the upper end 32, the lower end 34 and the sides 36, 38 described above with respect to FIG. 1. Returning to FIG. 5, the A-pillar garnish 110 can include an outer garnish panel 146, an inner garnish panel 148 and the gasket 50. The gasket 50 can be the same as or similar to the gasket 50 described above with respect to FIGS. 2-4.

The outer garnish panel 146 can include an exterior surface 142 of the A-pillar garnish 10. The gasket 50 can abut the exterior surface 40 of the A-pillar 14 and the inner garnish panel 148 can be sandwiched between the outer garnish panel 146 and the gasket 50. That is, the gasket 50 can be adjacent to the A-pillar 14, the inner garnish panel 148 can be adjacent to the gasket 50 and the outer garnish panel 146 can be adjacent to the inner garnish panel 148.

Instead of the extension panel 66 being a structure of the inner garnish panel 48 of FIGS. 2-4, the outer garnish panel 146 can include a pillar panel 164, an extension panel 166 and a first lower end 152 located at the end of the extension panel 166. The pillar panel 164 can extend from the upper end 32 (FIG. 1) of the A-pillar garnish 110 to the extension panel 166 and the extension panel 166 can extend away from the pillar panel 164 to the first lower end 152. The pillar panel 164 can cover and conceal the inner garnish panel 148 and the body of the gasket 50 from view.

The outer garnish panel 146 can extend from the upper end 32 (FIG. 1) of the A-pillar garnish 110 to the first lower end 152. The extension 70 of the gasket 50 can abut and extend along the extension panel 166. The extension 70 can extend away from the first lower end 152 of the outer garnish panel 146. The first lower end 152 can be spaced away from the hood inner panel 60 by the second distance D2 that is greater than the first distance D1. That is, the first lower end 152 of the outer garnish panel 146 can have the same spatial relationship as the second lower end 54 of the inner garnish panel of FIGS. 2-4.

The inner garnish panel 148 can terminate at a second lower end 154 that abuts the extension panel 166 and the inner corner 90 of the gasket 50. That is, the inner garnish panel 148 can extend from the upper end 32 (FIG. 1) to the second lower end 154. The second lower end 154 can abut the inner corner 90 of the gasket 50. The first lower end 152 can be located between the first end 56 of the gasket 50 and the second lower end 154 of the inner garnish panel 148.

The inner garnish panel 148 can include a first inner side 172, a first outer side 174, a first convex surface 176 and a first concave surface 178. The first inner side 172 can face and oppose the gasket 50. The first outer side 174 can face, oppose and abut the outer garnish panel 146. The first convex surface 176 can be on the first inner side 172 and the first concave surface 178 can be on the first outer side 174. The first convex surface 176 can protrude toward the A-pillar 14 and abut the second concave surface 86 of the gasket 50. The first concave surface 178 can face away from the A-pillar 14 and face toward the hood 20.

The A-pillar garnish 110 can include the connectors 102 as described above with respect to FIGS. 1-4.

FIG. 6 is a cross-sectional view of a second alternate embodiment of an A-pillar garnish 210. The A-pillar garnish 210 can include the upper end 32, the lower end 34 and the sides 36, 38 described above with respect to FIG. 1. Returning to FIG. 6, the A-pillar garnish 210 can include the outer garnish panel 46, an inner garnish panel 248 and the gasket 50. The outer garnish panel 46 and the gasket 50 can be same as or similar to those described above with respect to FIGS. 2-4.

The outer garnish panel 46 can include the exterior surface 42 of the A-pillar garnish 210. The gasket 50 can abut the exterior surface 40 of the A-pillar 14 and the inner garnish panel 248 can be sandwiched between the outer garnish panel 46 and the gasket 50. That is, the gasket 50 can be adjacent to the A-pillar 14, the inner garnish panel 248 can be adjacent to the gasket 50 and the outer garnish panel 46 can be adjacent to the inner garnish panel 248.

An extension panel (such as extension panel 66 and extension panel 166) can be omitted from both of the outer garnish panel 46 and the inner garnish panel 248. Instead of abutting the extension panel 66 of the inner garnish panel 48 as described above with respect to FIGS. 2-4, the first lower end 52 can abut the extension 70 of the gasket 50. The inner garnish panel 248 can include and terminate at a second lower end 254 that also abuts the extension 70. The inner garnish panel 248 can extend from the upper end 32 (FIG. 1) of the A-pillar garnish 210 to the second lower end 254. The outer garnish panel 46 can cover and conceal the inner garnish panel 248 and the body 68 of the gasket 50 from view.

The second lower end 254 can abut the inner corner 90 of the gasket 50. The first lower end 52 of the outer garnish panel 46 can be located between the first end 56 of the gasket 50 and the second lower end 254 of the inner garnish panel 248.

The inner garnish panel 248 can include a first inner side 272, a first outer side 274, a first convex surface 276 and a first concave surface 278. The first inner side 272 can face and oppose the gasket 50. The first outer side 274 can face, oppose and abut the outer garnish panel 46. The first convex surface 276 can be on the first inner side 272 and the first concave surface 278 can be on the first outer side 274. The first convex surface 276 can protrude toward the A-pillar 14 and abut the second concave surface 86 of the gasket 50. The first concave surface 278 can face away from the A-pillar 14 and face toward the hood 20.

The A-pillar garnish 210 can include the connectors 102 as described above with respect to FIGS. 1-4.

Figure 7:
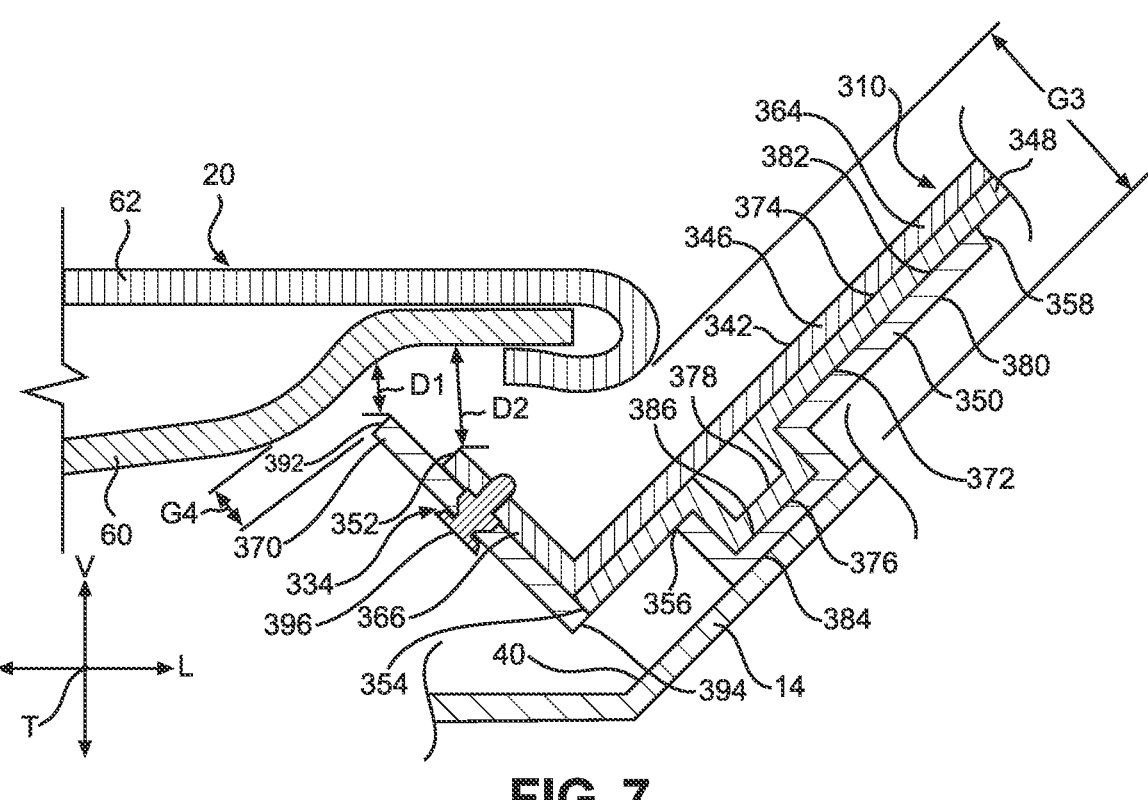
FIG. 7 is a cross-sectional view of a third alternate embodiment of the pillar garnish and taken along line 2-2 of FIG. 1.

FIG. 7 is a cross-sectional view of a third alternate embodiment of an A-pillar garnish 310. The A-pillar garnish 310 can include the upper end 32 and the sides 36, 38 described above with respect to FIG. 1. Returning to FIG. 7, the A-pillar garnish 310 can include a lower end 334, an outer garnish panel 346, an inner garnish panel 348. Instead of the single, continuous gasket 50 described above with respect to FIGS. 1-4 the A-pillar garnish 310 can include a first gasket 350 that extends along the A-pillar 14 and a second gasket 370 that is spaced away from the A-pillar 14 and extends into the airflow space G3. The second gasket 370 can form the lower end 334.

The outer garnish panel 346 can include an exterior surface 342 of the A-pillar garnish 310. The first gasket 350 can abut the exterior surface 40 of the A-pillar 14 and the inner garnish panel 348 can be sandwiched between the outer garnish panel 346 and the first gasket 350. That is, the first gasket 350 can be adjacent to the A-pillar 14, the inner garnish panel 348 can be adjacent to the first gasket 350 and the outer garnish panel 346 can be adjacent to the inner garnish panel 348.

Instead of the extension panel 66 being a structure of the inner garnish panel 48 of FIGS. 2-4, the outer garnish panel 346 can include a pillar panel 364, an extension panel 366 and a first lower end 352 located at the end of the extension panel 366. The pillar panel 364 can extend from the upper end 32 (FIG. 1) of the A-pillar garnish 310 to the extension panel 366 and the extension panel 366 can extend away from the pillar panel 364 and to the first lower end 352. That is, the outer garnish panel 346 can extend from the upper end 32 (FIG. 1) of the A-pillar garnish 310 to the first lower end 352. The pillar panel 364 can cover and conceal the inner garnish panel 348 and the first gasket 350 from view. The second gasket 370 can be mounted on the extension panel 366.

The inner garnish panel 348 can terminate at a second lower end 354 that that is adjacent to the extension panel 366 and the second gasket 370. That is, the inner garnish panel 348 can extend from the upper end 32 (FIG. 1) to the second lower end 354. The second lower end 354 can abut the second gasket 370.

The first gasket 350 can include a first end 356 and a second end 358. The first gasket 350 can extend along the A-pillar 14 from the first end 356 to the second end 358. The first end 356 can be located between and spaced away from the second end 358 and the second lower end 354 of the inner garnish panel 348.

The second gasket 370 can abut and extend along the extension panel 366. The second gasket 370 can extend away from the first lower end 352 of the outer garnish panel 346 and toward the hood inner panel 60. The second gasket 370 can include a first end 392 and a second end 394. The first end 392 can be located between the hood inner panel 60 and the second end 394. The second end 394 can be located between the first end 392 and the A-pillar 14. The second gasket 370 can extend away from the first lower end 352 of the outer garnish panel 346 and be spaced away from the hood inner panel by a first distance D1.

The first lower end 352 of the outer garnish panel 346 can be located between the first end 392 of the second gasket 370 and the second lower end 354 of the inner garnish panel 348. The first lower end 352 can be spaced away from the hood inner panel 60 by the second distance D2 that is greater than the first distance D1. That is, the first lower end 352 of the outer garnish panel 346 can have the same spatial relationship as the second lower end 54 of the inner garnish panel 48 of FIGS. 2-4.

The inner garnish panel 348 can include a first inner side 372, a first outer side 374, a first convex surface 376 and a first concave surface 378. The first inner side 372 can face and oppose the gasket 350. The first outer side 374 can face, oppose and abut the outer garnish panel 346. The first convex surface 376 can be on the first inner side 372 and the first concave surface 378 can be on the first outer side 374. The first convex surface 376 can protrude toward the A-pillar 14. The first concave surface 378 can face away from the A-pillar 14 and face toward the hood 20.

The first gasket 350 can include a second inner side 380, a second outer side 382, a second convex surface 384 and a second concave surface 386. The second inner side 380 can face and oppose the A-pillar 14. The second outer side 382 can face, oppose and abut the first inner side 372 of the inner garnish panel 348. The second convex surface 384 can be on the second inner side 380 and the second concave surface 386 can be on the outer side 382. The second convex surface 384 can protrude toward the A-pillar 14. The second concave surface 386 can face away from the A-pillar 14 and face toward the hood 20. The first convex surface 376 can abut the second concave surface 386.

The A-pillar garnish 310 can include a connector 396 that secures the second gasket 370 to the extension panel 366. The connector 396 is schematically illustrated in FIG. 7 and can be any appropriate connector such as, but not limited to, a resilient clip, a heat stake, a clamp, a threaded fastener, a rivet, a weld, and/or adhesive.

The A-pillar garnish 310 can include the connectors 102 as described above with respect to FIGS. 1-4.

Figure 8:
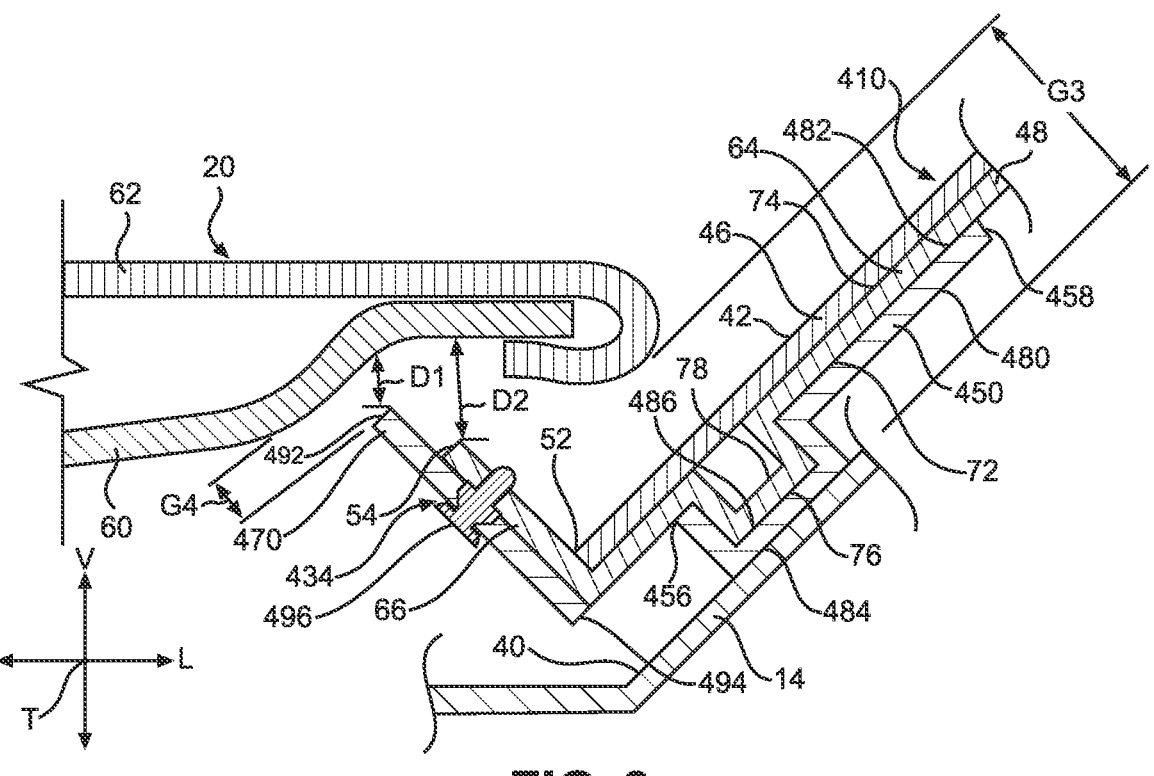
FIG. 8 is a cross-sectional view of a fourth alternate embodiment of the pillar garnish and taken along line 2-2 of FIG. 1.

FIG. 8 is a cross-sectional view of a fourth alternate embodiment of an A-pillar garnish 410. The A-pillar garnish 410 can include the upper end 32 and the sides 36, 38 described above with respect to FIG. 1. Returning to FIG. 8, the A-pillar garnish 410 can include a lower end 434, the outer garnish panel 46 and the inner garnish panel 48. The outer garnish panel 46 and the inner garnish panel 48 can be the same as or similar to the outer garnish panel 46 and the inner garnish panel 48 described above with respect to FIG. 1-4. Instead of the single, continuous gasket 50 described above with respect to FIGS. 1-4 the A-pillar garnish 410 can include a first gasket 450 that extends along the A-pillar 14 and a second gasket 470 that is spaced away from the A-pillar 14 and extends into the airflow space G3. The second gasket 470 can form the lower end 434.

The outer garnish panel 46 can include the exterior surface 42 of the A-pillar garnish 410. The first gasket 450 can abut the exterior surface 40 of the A-pillar 14 and the inner garnish panel 48 can be sandwiched between the outer garnish panel 46 and the first gasket 450. That is, the first gasket 450 can be adjacent to the A-pillar 14, the inner garnish panel 48 can be adjacent to the first gasket 450 and the outer garnish panel 46 can be adjacent to the inner garnish panel 48.

The first gasket 450 can include a first end 456 and a second end 458. The first gasket 450 can extend along the A-pillar 14 from the first end 456 to the second end 458. The first end 456 can be located between and spaced away from the second end 458 and the extension panel 66 of the inner garnish panel 48.

The second gasket 470 can abut and extend along the extension panel 66. The second gasket 470 can extend away from the second lower end 54 of the inner garnish panel 48 and toward the hood inner panel 60. The second gasket 470 can include a first end 492 and a second end 494. The first end 492 can be located between the hood inner panel 60 and the second end 494. The second end 494 can be located between the first end 492 and the A-pillar 14. The second gasket 470 can extend away from the second lower end 54 of the outer garnish panel 346 and be spaced away from the hood inner panel by a first distance D1.

The second lower end 54 of the outer garnish panel 46 can be located between the first end 492 of the second gasket 370 and the first lower end 52 of the inner garnish panel 48. The second lower end 54 can be spaced away from the hood inner panel 60 by the second distance D2 that is greater than the first distance D1. That is, the second lower end 54 of the inner garnish panel 48 can have the same spatial relationship as the second lower end 54 of the inner garnish panel 48 of FIGS. 2-4.

The first gasket 450 can include a second inner side 480, a second outer side 482, a second convex surface 484 and a second concave surface 486. The second inner side 480 can face and oppose the A-pillar 14. The second outer side 482 can face, oppose and abut the first inner side 72 of the inner garnish panel 48. The second convex surface 484 can be on the second inner side 480 and the second concave surface 486 can be on the outer side 482. The second convex surface 484 can protrude toward the A-pillar 14. The second concave surface 486 can face away from the A-pillar 14 and face toward the hood 20. The first convex surface 76 of the inner garnish panel 48 can abut the second concave surface 486.

The A-pillar garnish 410 can include a connector 496 that secures the second gasket 470 to the extension panel 66. The connector 496 is schematically illustrated in FIG. 8 and can be any appropriate connector such as, but not limited to, a resilient clip, a heat stake, a clamp, a threaded fastener, a rivet, a weld, and/or adhesive.

The A-pillar garnish 410 can include the connectors 102 as described above with respect to FIGS. 1-4.

While certain embodiments of the invention are described above, it should be understood that the invention can be embodied and configured in many different ways without departing from the spirit and scope of the invention.

Instead of being substantially perpendicular, exemplary embodiments can include the extension panel 66 and the extension 70 extending from the pillar panel 64 and the body 68, respectively, at any appropriate oblique angle.

In an alternative embodiment, the A-pillar garnish assembly disclosed herein can be modified for use with any typical metal side panel outer SPO in addition to or in place of the A-pillar 14. There is also the possibility that a garnish assembly as disclosed herein can be modified for use at a typical side panel outer SPO in which an assembled garnish is placed along the side of the glass (typically applied for water management).

Instead, only the gasket 50 extending under the hood 20 and into the airflow gap G3 as shown in FIG. 6, alternate embodiments can include an extension panel of either the inner garnish panel or the outer garnish panel that extends into the airflow gap G3, where the extension panel is the only structure of the A-pillar garnish that extends into the airflow gap G3.

Instead of the linear shapes shown in FIGS. 2-8, the convex surface 76, 176, 276, 376, 84, 384, 484 and the concave surfaces 78, 178, 278, 378, 86, 386, 486 can have any appropriate shape such as, but not limited to a curve, a combination of curved segments and linear segments, or a plurality of linear segments extending at obtuse angles from each other. In other alternate embodiments, the convex surface 76, 176, 276, 376, 84, 384, 484 and the concave surfaces 78, 178, 278, 378, 86, 386, 486 can be omitted. In other alternate embodiments, a projection on the inner side 72, 172, 272, 372 of the inner garnish panel 48, 148, 248, 348 can replace the convex surface 76, 176, 276, 376 and the concave surface 78, 178, 278, 378 of the inner garnish panel 48, 148, 248, 348 and can extend through a through hole formed in the gasket 50, 350, 450, and the convex surface 84, 384, 484 and the concave surface 86, 386, 486 of the gasket 50, 350, 450 can be omitted.

FIG. 1 is a perspective view of an exemplary vehicle 12 configured as a sport-utility vehicle or a cross-over vehicle. However, alternate embodiments of the vehicle 12 can include any type of vehicle, including a passenger car, minivan, truck, all-terrain vehicle (ATV), semi-tractor, off-highway vehicle, aircraft, watercraft, etc.

The vehicle 12 can have two of the doors 22—one on each side of the vehicle. Alternate embodiments of the vehicle 12 can have four or more doors and the door 22 can be referred to as a front door.

What is claimed is:

1. A vehicle comprising:
a windshield;
an A-pillar that is adjacent to the windshield;
a hood that is adjacent to the A-pillar and spaced away from the A-pillar by an airflow gap; and
an A-pillar garnish that extends along the windshield and covers at least a portion of the A-pillar, the A-pillar garnish extends underneath the hood and bends away from the A-pillar and toward the hood, and the A-pillar garnish extends into the airflow gap at a location that is underneath the hood.

2. The vehicle according to claim 1, wherein the A-pillar garnish includes, an outer garnish panel extends from a first location that is underneath the hood to a second location that is on the A-pillar, the second location is spaced away from the hood, a gasket that extends along the A-pillar, the gasket bends away from outer garnish panel and toward the hood, the gasket terminates at a first end that is adjacent to the hood, and an inner garnish panel that extends between the outer garnish panel and the gasket, the inner garnish panel bends away from the outer garnish panel and toward the hood, the inner garnish panel terminates at a second end that is adjacent to the hood, and the first end is spaced away from second end.

3. The vehicle according to claim 2, wherein the first end is spaced away from the hood by a first distance, and the second end is spaced away from the hood by a second distance that is greater than the first distance, and the second end is adjacent to a position on the inner garnish that is spaced inwardly from the first end.

4. The vehicle according to claim 3, wherein the inner garnish panel has a first rigidity, and the gasket has a second rigidity that is less than the first rigidity.

5. The vehicle according to claim 1, wherein the A-pillar garnish includes, a gasket that is adjacent to the A-pillar, an inner garnish panel that is adjacent to the gasket, and an outer garnish panel that is adjacent to the inner garnish panel and includes an exterior surface of the A-pillar garnish.

6. The vehicle according to claim 5, wherein the inner garnish panel includes, a pillar panel that extends along the A-pillar, and an extension panel that protrudes from the pillar panel, the extension panel is located underneath the hood and protrudes into the airflow gap and toward the hood.

7. The vehicle according to claim 6, wherein the pillar panel is located between the outer garnish panel and the gasket, and the outer garnish panel covers the pillar panel and exposes the extension panel.

8. The vehicle according to claim 6, wherein the pillar panel extends along the A-pillar in a first direction, and the extension panel protrudes away from the pillar panel and toward the hood in a second direction that is different from the first direction.

9. The vehicle according to claim 6, wherein the extension panel terminates at a first end, and the gasket includes, a body that extends along the A-pillar, and an extension that protrudes away from the body and extends along and beyond the extension panel, the extension panel terminates at a second end that is in the airflow gap at a location that is between the first end and the hood.

10. The vehicle according to claim 9, wherein the pillar panel is between the body and the outer garnish panel.

11. The vehicle according to claim 9, wherein the first end and the second end are spaced away from the hood.

12. The vehicle according to claim 6, wherein the outer garnish panel extends along the pillar panel and terminates at the extension panel.

13. The vehicle according to claim 5, wherein the gasket includes a concave surface, and the inner garnish panel includes a convex surface that abuts the concave surface.

14. The vehicle according to claim 5, wherein the gasket includes a first side that opposes the A-pillar, a second side that opposes the inner garnish panel, and a first projection that has a convex surface on the first side and concave surface on the second side, and the inner garnish panel includes a third side that opposes the second side of the gasket, a fourth side that opposes the outer garnish panel, and a second projection that has a convex surface on the third side of the inner garnish panel and a concave surface on the fourth side of the inner garnish panel.

15. A vehicle comprising:

a windshield;

an A-pillar that is adjacent to the windshield;

a hood that is adjacent to the A-pillar and spaced away from the A-pillar by an airflow gap; and a gasket that is adjacent to the A-pillar;

an inner garnish panel that is adjacent to gasket; and an outer garnish panel that is adjacent to the inner garnish panel, wherein at least one of the gasket and the inner garnish panel extends underneath the hood and bends away from the A-pillar and toward the hood, and the least one of the gasket and the inner garnish panel extends into the airflow gap at a location that is underneath the hood.

16. The vehicle according to claim 15, wherein the gasket includes, a body that extends along the A-pillar, and an extension that protrudes away from the body, toward the hood, and into the airflow gap, and a first corner formed by the body and the extension, and the inner garnish panel includes, a pillar panel that extends along the A-pillar, and an extension panel that protrudes away from the pillar panel, toward the hood, and into the airflow gap, and a second corner formed by the pillar panel and the extension panel, the second corner abuts the first corner.

17. The vehicle according to claim 15, wherein the gasket terminates at a first end, the first end is in the airflow gap, underneath the hood, and spaced away from the hood, and the inner garnish panel terminates at a second end, the second end is in the airflow gap, underneath the hood, and spaced away from both of the hood and the first end.

18. A vehicle comprising:

a windshield;

an A-pillar that is adjacent to the windshield;

a door hinged to the A-pillar, the door includes a front edge;

a hood that is adjacent to the A-pillar and spaced away from the A-pillar by an airflow gap, the hood includes a rear edge that opposes the front edge;

a panel gap that separates the front edge and the rear edge from each other; and an A-pillar garnish that extends along the windshield and covers at least a portion of the A-pillar, the A-pillar garnish extends underneath the hood and bends away from the A-pillar and toward the hood, and the A-pillar garnish extends into the airflow gap at a location that is underneath the hood.

19. The vehicle according to claim 18, wherein
the A-pillar garnish terminates at a first end that is spaced
   away from both of the A-pillar and the hood, and the
   first end is located underneath the hood.

20. The vehicle according to claim 19, wherein the
A-pillar garnish includes,
   a gasket that is adjacent to the A-pillar, the gasket includes
      the first end,
   an inner garnish panel that abuts the gasket, and
   an outer garnish panel that abuts the inner garnish panel
      and includes an exterior surface of the A-pillar garnish.

* * * * *